United States Patent [19]

Hagiya et al.

[11] Patent Number: 4,962,824
[45] Date of Patent: Oct. 16, 1990

[54] TRACTION CONTROL SYSTEM FOR MOTOR VEHICLES

[75] Inventors: Naoyuki Hagiya, Ageo; Toshifumi Maehara, Osato, both of Japan

[73] Assignees: Akebono Brake Industry Co., Ltd., Tokyo; Akebono Research and Development Centre Ltd., Saitama, both of Japan

[21] Appl. No.: 355,901

[22] Filed: May 22, 1989

[30] Foreign Application Priority Data

May 26, 1988 [JP] Japan .................................. 63-126951

[51] Int. Cl.$^5$ ............................................. B60T 8/32
[52] U.S. Cl. ............................... 180/197; 364/426.01; 303/97; 303/105
[58] Field of Search ................... 180/197, 76; 364/426; 303/97, 105, 106, 109

[56] References Cited

U.S. PATENT DOCUMENTS

4,701,855 10/1987 Fennel .......................... 180/197 X

Primary Examiner—Charles A. Marmor
Assistant Examiner—Alan M. Kagen

[57] ABSTRACT

In a traction control system for motor vehicles, a plurality of threshold values which are higher than the vehicle speed (equal to the non-driving wheel speed) are set up; the wheel speed as increasing or decreasing is compared with the above-mentioned plurality of threshold values to effect buildup or reduction of the brake fluid pressure; and holding of the brake fluid pressure is effected on the basis of a variation in the acceleration/deceleration of the driving wheel; in the case where the holding control mode in which the brake fluid pressure is held, persists for a predetermined time period or longer when the driving wheel speed is higher than a specific one of the above-mentioned plurality of threshold values, the holding control mode is switched to buildup control mode.

7 Claims, 7 Drawing Sheets

BRAKE FLUID PRESSURE CONTROL ROUTINE

FIG. 7

TRACTION CONTROL SYSTEM FOR MOTOR VEHICLES

BACKGROUND OF THE INVENTION

1. Field of the Invention

The present invention relates to a traction control system for motor vehicles, and more particularly it pertains to such a system wherein a slip of driving wheels which tends to be caused when the motor vehicle starts or accelerates is detected to control the braking of the driving wheels, thereby restraining the slip of the driving wheels.

2. Description of the Prior Art

Known in the art is a traction control system for motor vehicles, which is arranged, when the motor vehicle runs on a low-friction road surface such as a frozen, snow-covered or muddy one, to restrain a slip of driving wheel which tends to be caused in an attempt to start or accelerate the motor vehicle, thereby enhancing the starting/accelerating performance as well as the running stability of the vehicle. With such a conventional traction control system, it has been the usual practice that a slip of each of the left-hand and right-hand driving wheel is detected; and when the extent of the slip exceeds a predetermined value, a brake hydraulic pressure applied to a brake device for each driving wheel is increased so that the braking of the driving wheels is controlled, while at the same time the engine output is also controlled, as disclosed in Japanese Patent "Kokai" (Laid-opened) Publication No. 61-85248.

To control the brake hydraulic pressure to be applied to the driving wheels, the following procedures are commonly performed: A plurality of threshold levels are set up in relation to the vehicle speed so that a plurality of driving wheel speed ranges are established between adjacent ones of the aforementioned threshold levels; detection is made as to which speed range the current driving wheel speed belongs to, and detection is also made as to whether such driving wheel speed is increasing or decreasing; and buildup, reduction and holding of the brake hydraulic pressure for the driving wheels are controlled on the basis of such detections.

However, with the above-described traction control system, control of engine output is also effected in parallel with control of the brake fluid pressure so that when the control of the brake fluid pressure is effected on the basis of mere comparison of the driving wheel speed and the aforementioned speed range, excessive buildup/reduction of the brake fluid pressure is liable to occur, thus resulting in a hunting phenomenon tending to cause a great vibration to be generated in the vehicle body, which imparts an uncomfortable feeling to the passenger.

With a view to coping with such a situation, the inventors have proposed a traction control system for motor vehicles, which is adapted, during traction control, to prevent excessive buildup/reduction of the brake fluid pressure, thereby avoiding occurrence of vibration in the vehicle body (refer to Japanese Patent Application No. 63-10832).

In the traction control system as disclosed in the above Japanese patent application, a plurality of threshold values which are higher than the vehicle speed, are set up; during acceleration of the driving wheel, buildup of the brake fluid pressure is started at a time point when the speed of the driving wheel exceeds, for the first time, either a specific one or higher one of the plurality of threshold values; at a time point when a high peak of the driving wheel speed occurs where the driving wheel speed changes from increase to decrease, the buildup of the brake fluid pressure is interrupted, and the brake fluid pressure prevailing at the high-peak point is held; during deceleration of the driving wheel, at a time point when the driving wheel speed goes below any of the plurality of threshold values for the first time, reduction of the brake fluid pressure is started; and in the case where the reduction of the brake fluid pressure is continued until the driving wheel speed becomes lower than the lowest one of the plurality of threshold values, the reduction of the brake fluid pressure is interrupted at a time point when the driving wheel speed increases up to the lowest threshold value, and the brake fluid pressure prevailing at that time point is held. Furthermore, in the case where the driving wheel speed is in the region between the lowest and the highest threshold value of the plurality of threshold values, the reduction of the brake fluid pressure is interrupted at a time point when a low-peak of the driving wheel speed occurs where the driving wheel speed changes from decrease to increase, and the brake fluid pressure prevailing at the low-peak point is held.

As discussed above, with the above-described traction control system, control of the brake fluid pressure is effected in such a manner that buildup of the brake fluid pressure is interrupted at a time point when a high peak of the driving wheel speed as increasing is reached, and the brake fluid pressure prevailing at that time point is held; reduction of the brake fluid pressure is interrupted and changed to holding of the brake fluid pressure at a time point when a low peak of the driving wheel speed as decreasing occurs in the region between the lowest speed threshold value and the highest speed threshold value; and the holding of the brake fluid pressure is maintained until the driving wheel speed either exceeds a higher threshold value or goes below a lower threshold value. In this way, the brake fluid pressure is smoothly controlled without being excessively increased or reduced, thus preventing occurrence of vibration in the vehicle body which would otherwise tend to occur during traction control operation.

To achieve improved starting/accelerating performance while traction control is being effected, it is desirable that the brake fluid pressure be controlled in such a manner that the driving wheel speed when the motor vehicle starts or accelerates becomes closer not to the vehicle speed but to a speed which is higher than the vehicle speed by a predetermined slip ratio or slip quantity. With the system as disclosed in the above-mentioned Japanese Patent Application No. 63-10832, however, in the case where while the driving wheel speed is increasing gradually, a high peak of the driving wheel speed occurs so that the brake fluid pressure is held instead of being sufficiently increased, there is a tendency that such a situation persists that the driving wheel speed does not cross a higher threshold level. In such a case, the holding of the brake fluid pressure is continued so that the brake fluid pressure becomes short, and thus there is likelihood that with a much higher driving wheel speed than the target speed, engine torque and brake torque are balanced together such that excessive slip persists for a long time.

SUMMARY OF THE INVENTION

Accordingly, it is an object of the present invention to improve the traction control system for motor vehicles as disclosed in the aforementioned Japanese Patent Application No. 63-10832. More specifically, it is an object of the present invention to a traction control system for motor vehicles, which is designed such that excessive slip of the driving wheel is prevented which tends to occur in the case where while the driving wheel speed is increasing gradually, the brake fluid pressure is held without being sufficiently increased and such a condition that the brake fluid pressure is held, persists.

To achieve the foregoing objects, in accordance with the present invention, a plurality of threshold values which are higher than the vehicle speed (equal to the non-driving wheel speed) are set up; the wheel speed as increasing or decreasing is compared with the above-mentioned plurality of threshold values to effect buildup or reduction of the brake fluid pressure; and holding of the brake fluid pressure is effected on the basis of a variation in the acceleration/deceleration of the driving wheel; in the case where the holding control of the brake fluid pressure persists longer than a predetermined time period when the driving wheel speed is higher than a specific one of the above-mentioned plurality of threshold values, the holding control mode is switched to buildup control mode.

In this way, excessive buildup/reduction of the brake fluid pressure is prevented so that the brake fluid pressure is smoothly changed and thus it is possible to prevent vibration from occurring in the vehicle body during traction control operation, while at the same time preventing occurrence of excessive slip of the driving wheel as the driving wheel speed is gradually increasing. Thus, according to the present invention, it is possible to let the driving wheel speed quickly approach the target speed, and achieve traction control which is suited to the friction coefficient of the road surface on which the motor vehicle is running.

Other objects, features and advantages of the present invention will become apparent from the ensuing description taken in conjunction with the accompanying drawings.

DESCRIPTION OF THE PREFERRED EMBODIMENTS

Figure 1:
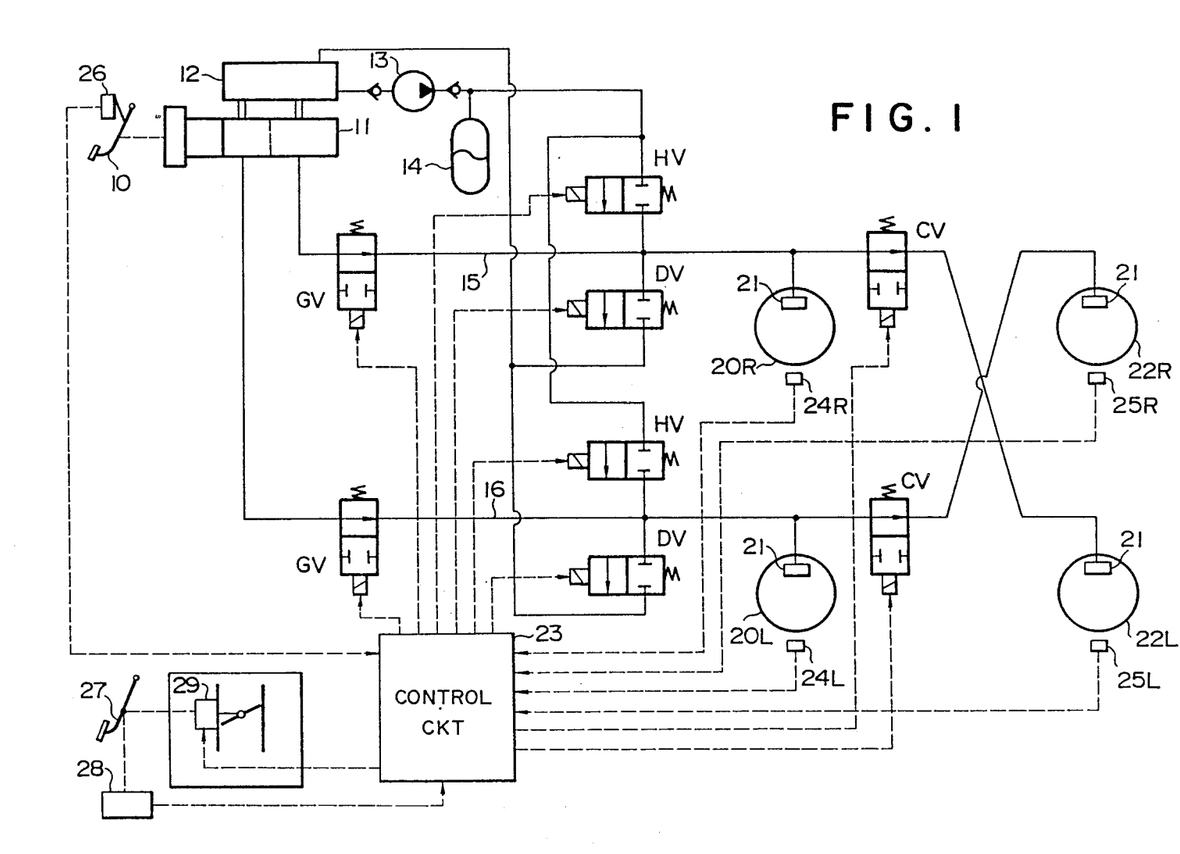
FIG. 1 is schematic view illustrating the traction control system according to an embodiment of the present invention.

Referring to FIG. 1, there is shown a systematic diagram of the traction control system according to an embodiment of the present invention, wherein a master cylinder 11 including two pressure chambers (not shown) is actuated through a brake pedal 10 serving as a brake operating member; brake fluid is pumped up by means of a pump 13 from a reservoir 12 attached to an upper portion of the master cylinder 11 and stored in an accumulator under a highly-pressurized condition.

One of the pressure chambers of the master cylinder 11 is connected to a wheel cylinder 21 of a brake device for braking a right-hand front wheel 20R (driving wheel) through a fluid passage 15 which is provided with a gate valve GV and the fluid passage 15 is connected to a wheel cylinder 21 of a brake device for braking a left-hand rear wheel 22L (non-driving wheel) through a cut valve CV. The other pressure chamber of the master cylinder 11 is connected to a wheel cylinder of a brake device for braking a left-hand front wheel 20L (driving wheel) through a fluid passage 16 which is provided with a gate valve GV and the fluid passage 16 is connected to a wheel cylinder 21 of a brake device for braking a right-hand rear wheel 22R (non-driving wheel) through a cut valve CV. Hold valves HV are connected between the fluid passage 15 and accumulator 14, and between the fluid passage 16 and the accumulator 14. Decay valves DV are connected between the fluid passage 15 and the reservoir 12, and between the fluid passage 16 and the reservoir 12. The highly pressurized brake fluid accumulated in the accumulator 14 is supplied to or interrupted from the wheel cylinders 21 through the opening/closing operation of the respective hold valves HV. The brake fluid contained in the wheel cylinders 21 is discharged to or interrupted from the reservoir 12 through the opening/closing operation of the respective decay valves DV.

The gate valves GV, cut valves CV, hold valves HV and decay valves DV may comprise solenoid valves and are also used to effect antilock control when the motor vehicle is braked, and the opening/closing operations of these valves are controlled in accordance with commands from a microcomputer-based control circuit 23. When the traction control is commenced with respect to the left-hand and right-hand driving wheels 20L and 20R, the gate valves GV and cut valves CV are closed; the wheel cylinders 21 for the driving wheels 20L and 20R are separated from the master cylinder 11; and the wheel cylinders 21 for the non-driving wheels 22L and 22R are separated from the fluid passages 15 and 16. When the gate valves GV and cut valves CV are closed, the wheel cylinders for the non-driving wheels 22L and 22R are held in such a state that no brake fluid pressure is applied thereto. The brake fluid pressure in the wheel cylinders 21 for the driving wheels 20L and 20R are increased when the hold valves HV are opened and the decay valves DV are closed; it is held when the hold valves HV and decay valves DV are closed; and it is reduced when the hold valves HV are closed and the decay valves are opened.

Connected to the control circuit 23 are wheel speed sensors 24L, 24R, 25L and 25R for detecting the speeds of the wheels 20L, 20R, 22L and 22R; a brake switch 26 for detecting depression of brake pedal 10; and a sensor 28 for detecting the extent of depression of an accelerator pedal 27. The control circuit 23 controls the engine output by driving a throttle control mechanism 29 of the engine in response to information derived from these sensors, while at the same time controlling the brake fluid pressure in the wheel cylinders 21 for the driving wheels 20L and 20R by causing the gate valves GV, cut valves CV, hold valves HV and decay valves DV to be opened and closed. When the brake switch 26 is operated, the traction control is ended immediately.

Figure 2:
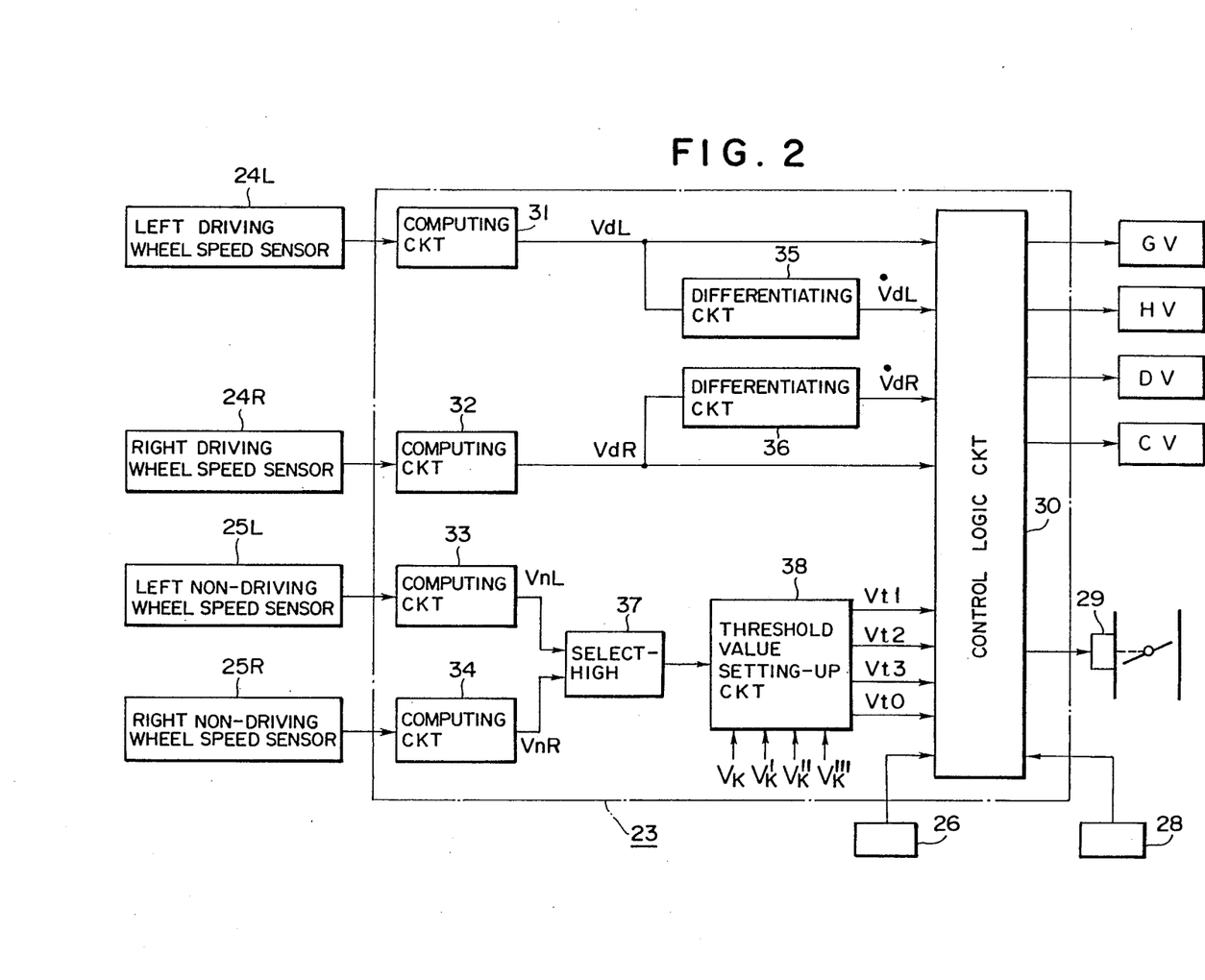
FIG. 2 is a block diagram illustrating the arrangement of control circuit incorporated in the system of FIG. 1.
Figure 3:
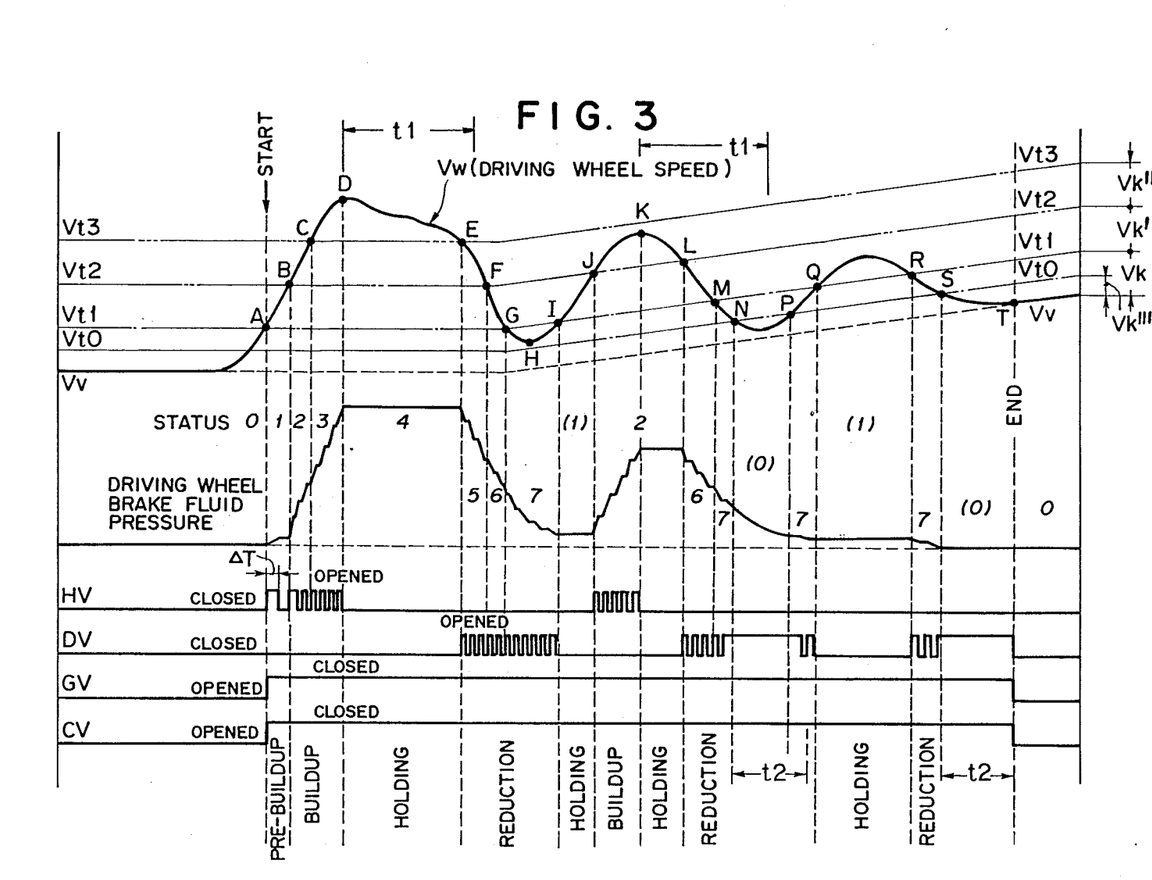
FIGS. 3, 4 and 5 show timing charts for brake hydraulic pressure control.
Figure 4:
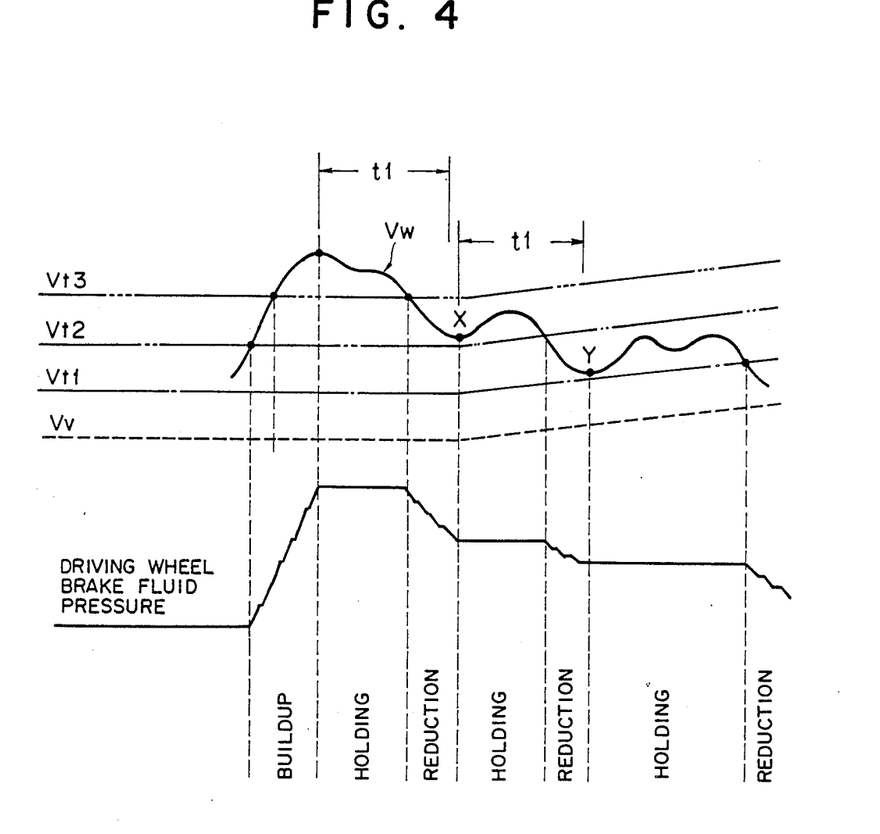
Figure 5:
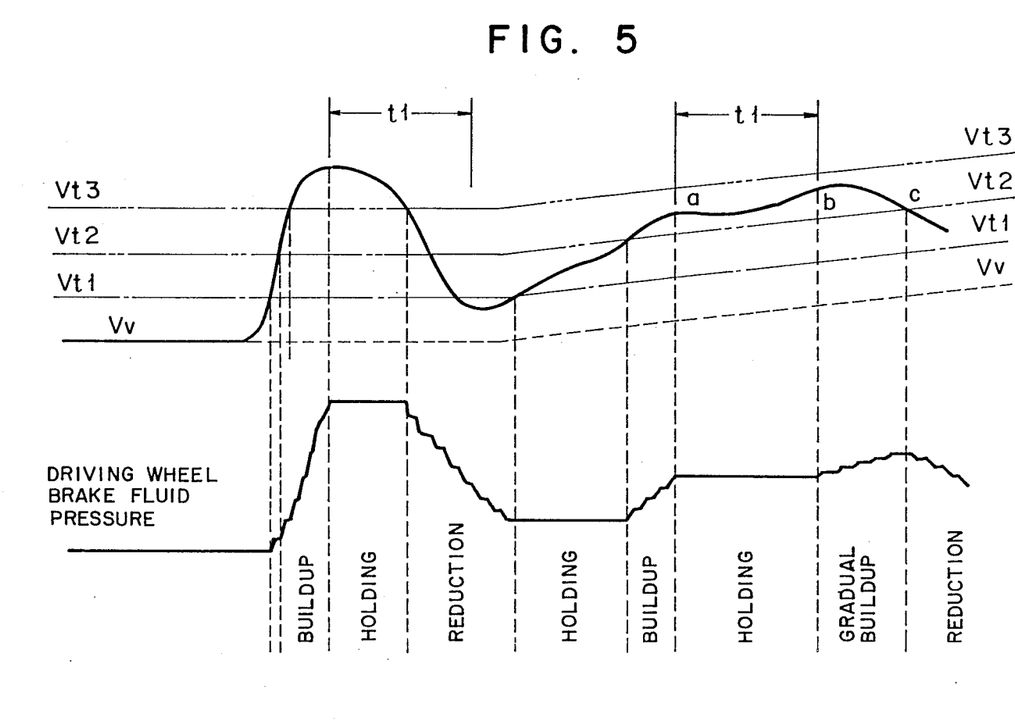

FIG. 2 shows the construction of the control circuit 23, and FIGS. 3, 4 and 5 show the timing charts for the traction control executed by the control circuit 23. The speeds of the driving wheels 20L and 20R are detected by wheel speed sensors 24L and 24R respectively, and driving wheel speeds VdL and VdR are computed in computing circuits 31 and 32. The wheel speeds VdL and VdR are inputted to a control logic circuit 30. The speeds of the left-hand and right-hand non-driving wheels 22L and 22R are detected by wheel speed sensors 25L and 25R respectively, and left-hand and right-hand non-driving wheel speeds VnL and VnR are computed in computing circuits 33 and 34 respectively. The left-hand and right-hand driving wheel speeds VdL and VdR are passed to differentiating circuits 35 and 36 respectively so that the acceleration/deceleration dVdL/dt and dVdR/dt of the wheel speeds VdL and VdR are inputted to the control logic circuit 30.

The speeds VnL and VnR of the left-hand and right-hand non-driving wheels 22L and 22R are provided to a select-high circuit 37 so that the higher one of the wheel speeds VnL and VnR is selected and computed to provide a computed vehicle speed Vv which is approximate to the real vehicle speed; and the computed vehicle speed Vv is provided to an adding circuit 38 in which a first predetermined value Vk is added to the computed vehicle speed Vv to provide a first threshold value $Vt1(=Vv+Vk)$ as shown in FIG. 3; a second predetermined value Vk' is added to the first threshold value Vt1 to provide a second threshold value $Vt2(=Vv+Vk+Vk')$; and a third predetermined value Vk'' is added to the second threshold value Vt2 to provide a third threshold value $Vt3(=Vv+Vk+Vk'+Vk'')$. Further, another threshold value Vt0, which serves as control ending threshold, is established between the computed vehicle speed Vv and the first threshold value Vt1 by adding a fourth predetermined value Vk''' to $Vv(Vt0=Vv+Vk''')$. The threshold values Vt0 to Vt3 are inputted to the control logic circuit 30. In response to the various signals mentioned above, the control circuit 23 drives a throttle control mechanism 29 to control the throttle opening degree when the motor vehicle starts or accelerates, while at the same time controlling the opening/closing operations of the hold valves HV, decay valves DV and so forth, thereby controlling the brake fluid pressure at wheel cylinders 21 for left-hand and right-hand driving wheels 20L and 20R so that traction control is performed as shown in FIG. 3.

Figure 6:
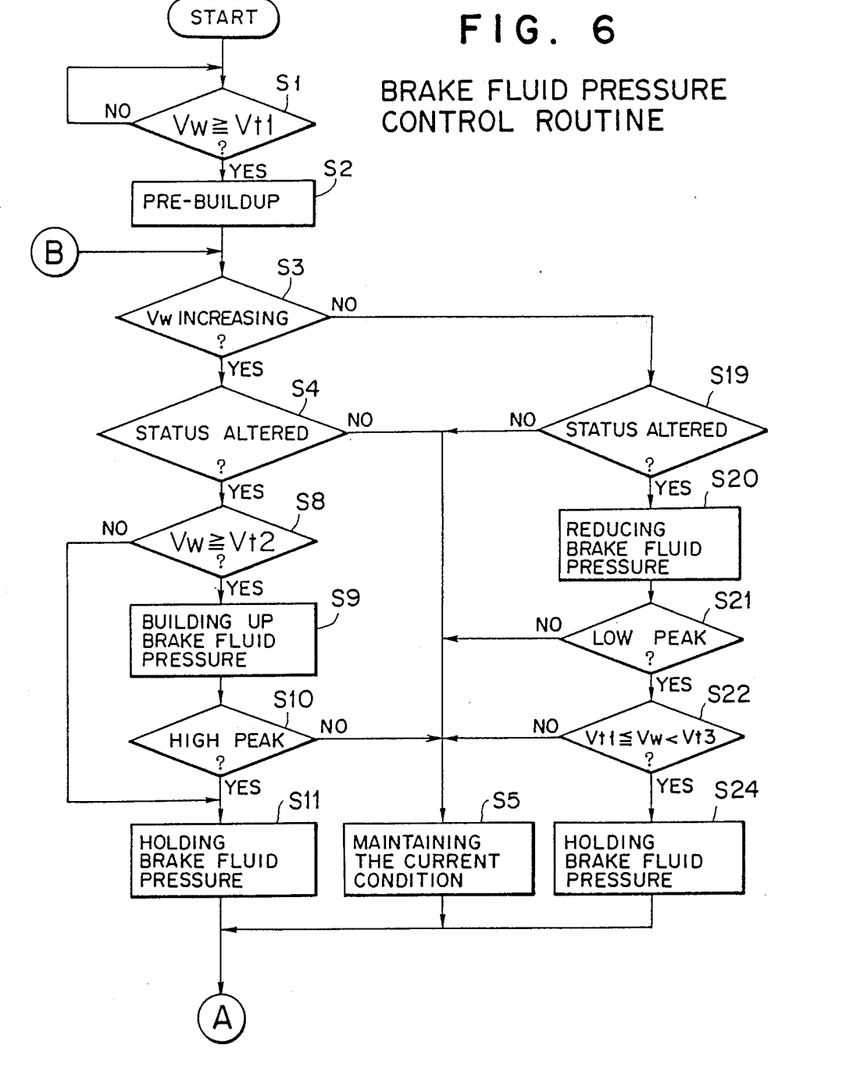
FIGS. 6 and 7 show a flow charts for brake hydraulic pressure control routine.
Figure 7:
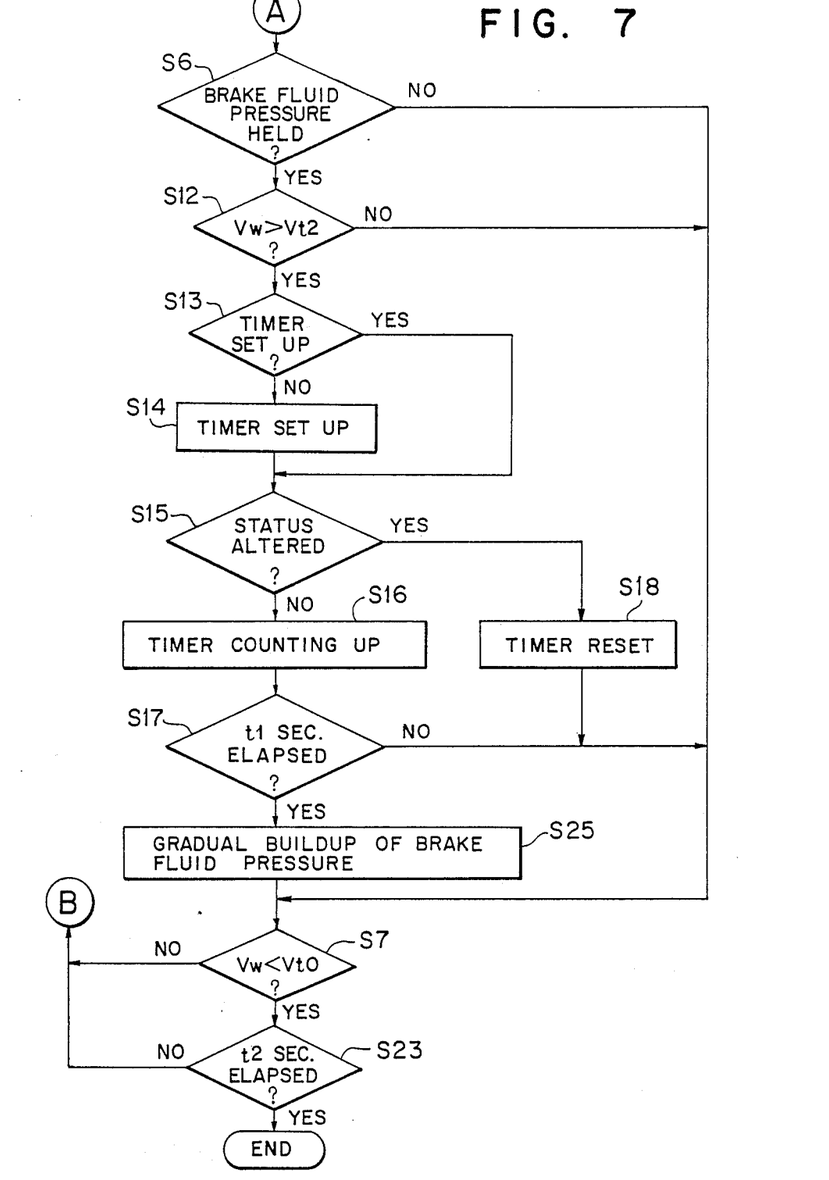

Description will now be made of an example of traction control system performed by the control circuit 23, by referring to FIGS. 3, 4 and 5 showing timing charts for brake fluid pressure control at each status, and FIGS. 6 and 7 showing flow charts for control routine. In this example of traction control, brake fluid pressure control is effected independently with respect to the left-hand and right-hand driving wheels. In the ensuing explanation, any particular one of the left-hand and right-hand driving wheel speeds VdL and VdR is represented by Vw.

[STATUS 0]

This is status at which no traction control is effected. Before the control is started, the wheel speed Vw is lower than the first threshold value Vt1 (Vw<Vt1); and the control is started after a lapse of time period t from the time point when the wheel speed Vw becomes lower than the threshold value Vt0. In this case, both the hold valves HV and decay valves DV are closed; both the gate valves GV and cut valves CV are opened; and the brake fluid pressure is in a state of maximum reduction.

[STATUS 1: PRELIMINARY PRESSURE BUILDUP]

As the wheel speed Vw is increased, the result of judgment made at step S1 becomes "YES" at a time point A (see FIG. 3) when the wheel speed Vw becomes equal to the first threshold value Vt1, and the process proceeds to step S1 in FIG. 6 so that control is started. At the time point A, the gate valves GV and cut valves CV are closed, and the hold valves HV are opened for a preset time ΔT to effect preliminary buildup of the brake fluid pressure.

At the next step S3, judgment is made as to whether or not the wheel speed Vw is increasing. At the next step S4, judgment is made as to whether or not the status has changed. The status remains unchanged until the wheel speed Vw reaches the second threshold value Vt2. Thus, the process proceeds to step S5 while the condition at the status 1 is maintained. The process now proceeds to step S6 in FIG. 7. At the step S6, judgment is made as to whether or not holding mode occurs. In this case, the result of the judgment at the step S6 is "NO", and thus the process proceeds to the step S7. Such a procedure that the process proceeds to step S6 via the steps S4 and S5, is always repeated for each subsequent status. The step S6 constitutes one of the control ending conditions. In this case, since the condition that Vw<Vt0 is not prevailing, the process returns to the step S3 and proceeds to the step S4.

[STATUS 2: PRESSURE BUILDUP]

When the wheel speed Vw as increasing reaches the second threshold value Vt2 at a time point B, the result of the judgment made at the step S4 becomes "YES", and needless to say, the result of judgment at step S8 (Vw≧Vt2?) also becomes "YES"; thus the process proceeds to step S9 at which buildup of the brake fluid pressure is started. The hold valves HV are opened and closed with ON-OFF intervals which are preset in accordance with the acceleration dVw/dt which occurs when the wheel speed Vw becomes equal to the second threshold value Vt2 (Vw=Vt2), as a result of which the brake fluid pressure builds up step-wise.

[STATUS 3: PRESSURE BUILDUP]

The wheel speed Vw increases further, and reaches a third threshold value Vt3 at a time point C. At step S10, judgment is made as to whether or not a high peak of the wheel speed Vw is reached. In this case, the result of judgment at step S10 is "NO", and hence the process returns to the step S3 via the steps S5, S6 and S7, and again to steps S9 via the steps S4 and S8, so that the pressure buildup continues. The hold valves HV are opened and closed with ON-OFF intervals which are set up in accordance with the acceleration dVw/dt which occurs when the wheel speed Vw becomes equal to the third threshold value (Vw=Vt3), so that the brake fluid pressure further builds up step-wise.

[STATUS 4: PRESSURE HOLDING]

At a time point D when a high peak of the wheel speed Vw is reached, the result of judgment at step S10 becomes "YES", and thus the process proceeds to step S11 where the hold valves HV are closed so that the brake fluid pressure prevailing at the time point D is held. At this time, the result of the judgment made at the step S6 in FIG. 7 becomes "YES", and the process proceeds to step S12 where judgment is made as to whether or not the wheel speed Vw exceeds the second threshold value Vt2. In this case, the result of the judgment at the step S12 is "YES", and thus the process proceeds to step S13 where judgment is made as to whether or not a timer with a set time t1 (300 ms for example) is set. In this case, the result of the judgment at the step S13 is "NO", and thus the timer is set at the subsequent step S14. At the next step S15, judgment is made as to whether or not the status has changed. When the result of the judgment at the step S15 is "NO", then the timer is made to count up at the next step S16. As long as it is judged that the timer does not time up at the step S17, the process returns to the step S3 via the step S7. When the result of the judgment at the step S15 becomes "YES", the process proceeds to step S18 where the timer is reset, and the process proceeds to the step S7. At and after the time point D, the wheel speed Vw is changed from increase to decrease so that the result of judgment at the step S3 becomes "NO", and thus the process flow of FIG. 6 shifts to right-hand side step S19 where like at the steps S4, judgment is made as to whether or not the status has changed. Unless the status has changed, the process repeatedly takes the passage S5 - S6 - S12 - S17 - S7 - S3.

[STATUS 5: PRESSURE REDUCTION]

When the wheel speed as decreasing becomes lower than the third threshold value Vt3 at a time point E, the result of judgment at step S19 becomes "YES", and thus the process proceeds to step S20 so that reduction of the brake fluid pressure is started. The decay valves DV are opened and closed with ON-OFF intervals which are preset in accordance with the deceleration dVw/dt which occurs when the wheel speed Vw becomes equal to the third threshold value Vt3 (Vw=Vt3), so that the brake fluid pressure is reduced step-wise. At the next step S21, judgment is made as to whether or not a low peak of the wheel speed Vw is reached. In this case, the result of judgment at step S21 is "NO", and thus the process proceeds to the step S5 so that the reduction of the brake fluid pressure is continued.

[STATUS 6: PRESSURE REDUCTION]

The wheel speed Vw further drops, and reaches the second threshold value Vt2 at a time point F; thus the result of judgment at step S19 becomes "YES" again, and the process proceeds to step S20. The decay valves DV are opened and closed with ON-OFF intervals which are preset in accordance with the deceleration dVw/dt which occurs when the wheel speed Vw becomes equal to the second threshold value Vt2 (Vw=Vt2), so that the brake fluid pressure is further reduced.

[STATUS 7: PRESSURE REDUCTION]

The wheel speed Vw further decreases, and reaches the first threshold value Vt1 at a time point G; thus the result of judgment at step S19 becomes "YES" again, and the process proceeds to step S20. The decay valves DV are opened and closed with ON-OFF intervals which are preset in accordance with the deceleration dVw/dt which occurs when the wheel speed Vw becomes equal to the first threshold value Vt1 (Vw=Vt1), so that the brake fluid pressure is further reduced. A low peak of the wheel speed Vw is reached at a time point H, and the result of judgment at step S21 becomes "YES"; thus the process proceeds to step S22 where judgment is made as to whether or not the wheel speed Vw lies in the region between the first threshold value Vt1 and the third threshold value Vt3. In this case, since the wheel speed Vw is lower than the first threshold value Vt1 (Vw<Vt1), the result of judgment at step S22 is "NO". In this way, the reduction of the brake fluid pressure is further maintained so that the wheel speed Vw is changed from increase to decrease, and thus the control flow shifts to the step S4.

[STATUS (1): PRESSURE HOLDING]

If the wheel speed increases up to the first threshold value Vt1 at a time point I, then the result of judgment at the step S4 becomes "YES", and the process proceeds to the step S8. In this case, since the wheel speed Vw is lower than the second threshold value Vt2 (Vw<Vt2), the result of judgment at the step S8 is "NO" so that the process proceeds to step S11 and the brake fluid pressure prevailing at the time point I is held. Subsequently, the process proceeds to the step S12 via the step S6. In this case, the result of the judgment at the step S12 becomes "NO", and thus the timer is not set. This brake fluid pressure holding state is maintained until the status is changed. When the wheel speed Vw reaches the second threshold value Vt2, pressure buildup is started; and when the wheel speed Vw becomes lower than the first threshold value Vt1, pressure reduction is started.

[STATUS (0): PRESSURE REDUCTION]

In a manner similar to that mentioned above, at a time point J when the wheel speed Vw reaches the second threshold value Vt2, pressure buildup is started; at a time point K when a high peak of the wheel speed Vw occurs, the brake fluid pressure is held; at a time point L when the wheel speed Vw drops down to the second threshold value Vt2, pressure reduction is started; at a time point M when the wheel speed further drops down to the first threshold value Vt1, status 7 occurs again. At a time point N, the wheel speed Vw reaches the control ending threshold value Vt0. At this point of time, the result of judgment at the step S7 becomes "YES" for the first time, and thus the process proceeds to step S23 where judgment is made as to whether or not preset time t2 in second has elapsed from the time point when the wheel speed Vw became lower than Vt0. The result of judgment at the step S15 is "NO" until the preset time t2 in second elapses from the time point N, and the control process returns to step S3. The pressure reduction at the status (0) is effected with the decay valves being opened.

At a time point Q when the wheel speed Vw becomes higher than the first threshold value Vt1, the status (1) occurs again wherein the brake fluid pressure is held. More specifically, at this status (1), the result of judgment at step S8 is "NO", and thus the process proceeds to step S11 so that the brake fluid pressure is held. Status 7 occurs at a time point R when the wheel speed Vw becomes lower than the first threshold value Vt1, so that the brake fluid pressure is reduced. At a time point S when the wheel speed Vw becomes lower than the control ending threshold value Vt0, the status (0) occurs again so that the result of judgment at the step S7 becomes "YES", and the process proceeds to step S23 where judgment is made as to whether or not the preset time t2 has elapsed. At a time point T when the preset time t2 elapses from the time point S, the result of judgment at step S23 becomes "YES" so that the control is ended, and the control process returns to the status 0, and the gate valves GV and cut valves CV are opened.

FIG. 4 shows the case where a low peak of the wheel speed Vw is decreasing is reached when the wheel speed Vw lies in the region between the first threshold value Vt1 and the third threshold value Vt3 while the brake fluid pressure is being reduced. In this case, the result of judgment at the step S22 becomes "YES" and the process proceeds to the step S24 where at time points X and Y when a low peak of the wheel speed Vw occurs, the brake fluid pressure is held. In this case, at the time point S, the timer is set at the step S14, while at the time point Y, the timer is not set. Such a state that the brake fluid pressure is held, is maintained until status change occurs, thus preventing occurrence of excessive pressure buildup or reduction. The control of the brake fluid pressure is effected in such a manner that at a time point when the wheel speed Vw as increasing becomes higher than the second threshold value Vt2 or third threshold value Vt3 for the first time, buildup of the brake fluid pressure is started and at a time point when the wheel speed Vw as decreasing becomes lower than the second threshold value Vt2 or first threshold value Vt1 for the first time, reduction of the brake fluid pressure is started.

FIG. 5 shows such a case that when the wheel speed Vw is higher than the second threshold value Vt2, the status remains unchanged even if the holding mode persists for time period t1. In such a case, at a time point b when the time period elapses from a time point a when the holding mode is started, the timer counts up, and thus the result of the judgment made at the step S17 in FIG. 7 becomes "YES", so that the process proceeds to step S25 where the holding mode is switched to buildup mode so that step-like buildup of the brake fluid pressure is started. In view of the fact that the engine torque and brake torque are balanced together, the pressure buildup in this case is effected with a gentler gradient than buildup effected at the step S9. Because of the pressure buildup effected at the step D25, the wheel speed Vw becomes lower than the second threshold value Vt2, and at a time point c when the wheel speed Vw becomes equal to the second threshold value Vt2, reduction mode occurs.

As will be appreciated from the above discussion, according to this embodiment, the brake fluid pressure is controlled such that a time point when a high peak of the wheel speed Vw as increasing is reached, buildup of the brake fluid pressure is interrupted, and the brake fluid pressure prevailing at that time point is held; at a time point when a low peak of the wheel speed as decreasing is reached in the speed region between the lowest or first threshold value Vt1 and the highest or third threshold value Vt3, reduction of the brake fluid pressure is interrupted, and the brake fluid pressure prevailing at that time point is held; and the holding of the brake fluid pressure is maintained until the status changes. In this way, the brake fluid pressure is smoothly changed without being excessively increased or reduced, so that vibration which would otherwise tend to occur in the vehicle body during traction control operation, can be prevented.

Furthermore, according to this embodiment, when the time period t1 set at the timer provided during the holding mode in which the driving wheel speed Vw exceeds the second threshold value Vt2, elapses, the holding mode is switched to buildup mode in which the brake fluid pressure is permitted to build up with a gentle gradient, so that it is possible to prevent persistence of such a condition that engine torque and brake torque are balanced together when the wheel speed Vw greatly exceeds the target speed (the first threshold value Vt1 in this case), and thus it is possible to let the driving wheel speed Vw quickly approach the target speed, and to effect traction control suited to the friction coefficient of the road surface on which the motor vehicle is running.

While the present invention has been illustrated and described with respect to some specific embodiments thereof, it is to be understood that the present invention is by no means limited thereto but encompasses all changes and modifications which will become possible within the scope of the appended claims.

We claim:

1. A traction control system for motor vehicles, wherein a slip of a driving wheel which tends to occur when the motor vehicle starts or accelerates, is detected; and a braking force imparted to said driving wheel is controlled on the basis of said detection, thereby restraining the slip of said driving wheel, said traction control system comprising:
   (a) Wheel speed detecting means for detecting left-hand and right-hand driving wheel speeds;
   (b) Threshold value setting-up means for setting up a plurality of predetermined threshold values in relation to the vehicle speed, said threshold value being higher than said vehicle speed and being determined by adding a predetermined value to the higher one of left-hand and right-hand non-driving wheel speeds; and a computed vehicle speed is determined from the higher one of the left-hand and right-hand non-driving wheels; and
   (c) means for effecting buildup or reduction of the brake fluid pressure on the basis of a comparison of the speed of said driving wheel as acceleration or deceleration and said plurality of predetermined threshold values, and for causing a holding mode in which the brake fluid pressure is held to occur at a time point when the driving wheel speed changes from increase to decrease; and
   (d) means for switching said holding mode to a buildup mode in which the brake fluid pressure is increased when the brake fluid pressure holding mode has continued for or longer than a predetermined time period while said driving wheel speed is higher than a specific one of said plurality of threshold values such that excessive reduction of brake fluid pressure is prevented thus preventing vibration from occurring in said vehicle during traction control.

2. A traction control system according to claim 1, wherein said predetermined time period is set to be 300 msec.

3. A traction control system according to claim 1, wherein higher one of the left-hand and right-hand non-driving wheel speeds is selected as a computed vehicle speed; and a speed higher by a predetermined value than the computed vehicle speed is set as said threshold value.

4. A traction control system according to claim 1, wherein higher one of left-hand and right-hand non-driving wheel speeds is selected as a computed vehicle speed; and three different vehicle speeds are set as a first threshold value Vt1, second threshold value Vt2 and third threshold value Vt3 (Vt1<Vt2<Vt3); wherein status 1, status 2 and status 3 occur when the respective driving wheel speeds as increasing lie in a region between the first and second threshold values, in a region between the second and third threshold values, and in a region between above the third threshold value respectively; and status 4, status 5 and status 6 occur when the respective driving wheel speeds as decreasing lie in the region above the third threshold value, in the region between the third and second threshold values, and in the region between the second and first threshold values respectively; wherein when no restriction is laid upon buildup/reduction of the brake fluid pressure, the brake fluid pressure is increased at the status 2 and status 3, held at the status 4, and reduced at the status 5 and status 6.

5. A traction control system according to claim 4, wherein in the case where when said holding mode has persisted for a predetermined time period or longer while the driving wheel speed is higher than a second one of said plurality of threshold values, said holding mode is interrupted and switched to the buildup mode.

6. A traction control system according to claim 5, wherein when the holding mode is switched to the buildup mode, buildup of the brake fluid pressure is effected with a gentle gradient.

7. A traction control system according to claim 4, wherein at the status 1 which occurs immediately after the traction control is started, preliminary pressure buildup is effected; and at status 1 which occurs subsequently, the brake fluid pressure is held.

* * * * *